United States Patent [19]

Süling et al.

[11] 4,326,051

[45] Apr. 20, 1982

[54] ACRYLONITRILE POLYMERIZATION WITH ORGANIC SOLVENT

[75] Inventors: Carlhans Süling, Odenthal; Siegfried Korte, Leverkusen; Theo Neukam, Dormagen, all of Fed. Rep. of Germany

[73] Assignee: Bayer Aktiengesellschaft, Leverkusen, Fed. Rep. of Germany

[21] Appl. No.: 170,376

[22] Filed: Jul. 21, 1980

Related U.S. Application Data

[62] Division of Ser. No. 56,493, Jul. 11, 1979, abandoned.

[30] Foreign Application Priority Data

Jul. 28, 1978 [DE] Fed. Rep. of Germany ....... 2833143

[51] Int. Cl.$^3$ ........................ C08F 2/06; C08F 22/30
[52] U.S. Cl. ........................ 528/386; 8/510; 526/214; 526/230; 526/262; 526/329.3; 526/341; 526/271; 526/272; 526/342; 528/382
[58] Field of Search ........................ 528/382, 385, 386; 526/230, 262, 214, 271, 272, 329.3, 330, 342, 341

[56] References Cited

U.S. PATENT DOCUMENTS

| | | | |
|---|---|---|---|
| 3,141,869 | 7/1964 | Dennstedt | 526/329.3 X |
| 3,161,630 | 12/1964 | Phelisse | 526/341 X |
| 3,174,954 | 3/1965 | Nakayama | 526/329.3 X |
| 3,255,158 | 6/1966 | Anthes | 526/329.3 X |
| 3,395,133 | 7/1968 | D'Alelio | 526/329.3 X |
| 3,878,178 | 4/1975 | Guinn | 526/287 X |
| 4,136,246 | 1/1979 | Li | 526/287 X |
| 4,140,844 | 2/1979 | Lohwasser | 526/341 |
| 4,143,020 | 3/1979 | Emmons | 526/287 X |

*Primary Examiner*—C. A. Henderson
*Attorney, Agent, or Firm*—Sprung, Felfe, Horn, Lynch & Kramer

[57] ABSTRACT

The invention relates to a homopolymer or copolymer of acrylonitrile which comprises from 0 to 30% by weight, incorporated by polymerization, of comonomer units which are free from ionic groups, said polymers having a K-value of from 50 to 100, a dye absorption capacity for cationic dyes of at least 0.5% by weight, a conductivity, measured in dimethylformamide solution, of at least 10$\mu$ Siemens, and from 0.2 to 1.5% by weight of sulphur fixed to said polymer as well as to a process for the production thereof.

6 Claims, No Drawings

ACRYLONITRILE POLYMERIZATION WITH ORGANIC SOLVENT

CROSS REFERENCE TO RELATED APPLICATION

This is a division, of application Ser. No. 056,493, filed July 11, 1979 now abandoned.

BACKGROUND OF THE INVENTION

1. Field of the Invention

The present invention relates to acrylonitrile copolymers and polyacrylonitriles free from comonomers, which have improved dye absorption for basic dyes, and to a process for the preparation of polyacrylonitrile and of copolymers predominantly containing acrylonitrile by means of polymerisation in aliphatic hydrocarbons in the presence of a redox catalyst system.

2. Discussion of Prior Art

It is well known that the preparation of polyacrylonitrile and of copolymers predominantly containing acrylonitrile, which may be used for example for spinning into fibres of the acrylic or modacrylic type, or as thermoplastic materials for the production of foils or hollow bodies such as bottles, is carried out mainly in aqueous media. This method of production comprises several stages including distillations for working up the polymer, and complete recycling of all the components of the system is therefore difficult and above all entails high energy consumption.

In addition, acrylonitrile polymers obtained from aqueous media generally require the use of ionic comonomers in order to obtain good dye absorption with cationic or anionic dyes. This frequently leads to ecological problems.

It is also known to polymerise acrylonitrile in aliphatic and aromatic hydrocarbons, using azo catalysts (Faserforschung and Textiltechnik 12 (1961), 5, page 208 and Faserforschung and Textiltechnik 15 (1965), page 331).

It has generally been found, however, that when polymerisation is carried out in such systems, the use of azo catalysts and peroxidic compounds alone, that is without the addition of activating components, requires relatively high reaction temperatures which causes severe discolouration of the products and great molecular non-uniformity. Another disadvantage of this particular method is that the ionic dye comonomers normally used must be completely dispensed with because they are insoluble in the system, and therefore do not become chemically fixed in the course of polymerisation. This has a disadvantageous effect upon the colour characteristics of the polymers obtained and upon those of the shaped products manufactured from them.

Although it is known, having been described mainly for solvent-free polymerisation of vinyl chloride, that acceptable conversion ratios can still be obtained at substantially lower polymerisation temperatures by using a starter system consisting of an organic hydroperoxide, sulphur dioxide and a nucleophilic basic reagent, it is made quite clear that the basic component is essential. Its absence results in a severe loss in yield and due to the incorporation of sulphur dioxide in the polymer chain in the form of sulphone groups, it results in thermally unstable polymers. (Chem. Ing. No. 16, 43 (1971), page 941).

The catalyst system mentioned above cannot be used for the homopolymerisation and copolymerisation of acrylonitrile in aliphatic hydrocarbons because in these media, the reaction of sulphur dioxide with the proposed basic components results in the precipitation of a salt-type compound which interferes with the progress of polymerisation and has no activating effect.

SUMMARY OF THE INVENTION

It has now been found that acrylonitrile, either alone or in the presence of other copolymerisable monomers, can be polymerised effectively in aliphatic hydrocarbons at low reaction temperatures to produce easily processed products which surprisingly have excellent dye absorption for cationic dyes, even in the absence of special dye comonomers, and by virtue of their narrow molecular distribution have an excellent colour tone in the undyed state and a good thermostability. This is achieved by using a starter system consisting of sulphur dioxide, a hydroperoxide which is soluble in aliphatic hydrocarbons and an acid which is soluble in the system.

DESCRIPTION OF PREFERRED EMBODIMENTS

The present invention therefore provides a process for the preparation of polyacrylonitrile and of copolymers containing predominantly acrylonitrile, characterised in that acrylonitrile, either alone or with up to 30% by weight of at least one ethylenically unsaturated comonomer, is polymerised to conversions of 40 to 95% by weight at temperatures of from 0° to 60° C., optionally under pressure, in an aliphatic hydrocarbon having a boiling point of from $-10°$ C. to 80° C. or in mixtures of aliphatic hydrocarbons boiling in the range of from $-10°$ C. to 80° C., in the presence of a starter system consisting of from 0.1 to 8.0 mol % of sulfur dioxide, 0.1 to 2.0 mol % of a hydroperoxide which is soluble in the reaction medium and 0.01 to 1.0 mol % of an acid which is soluble in the reaction system (based in each case on the quantity of monomers used).

The process of the present invention results in homopolymers and copolymers of acrylonitrile in which there are incorporated, by polymerisation, up to 30% by weight of comonomer units which are free from ionic groups, and which are characterised by having K-values of from 50 to 100, a dye absorption capacity for cationic dyes of at least 0.5% by weight, a conductivity when measured in dimethylformamide solution of at least $10\mu$ Siemens, and by containing from 0.2 to 1.5% by weight of sulfur chemically fixed in the polymer. The present invention also provides these polymers.

Suitable comonomers for the purposes of the present invention include all ethylenically unsaturated compounds which are copolymerisable with acrylonitrile and which are soluble in the aliphatic hydrocarbons used as precipitation medium and in their mixtures with acrylonitrile, Particularly suitable comonomers are the esters of acrylic and methacrylic acid, vinyl esters of aliphatic carboxylic acids, unsubstituted styrene, and styrene substituted by alkyl groups, e.g. α-methylstyrene, 4-tert.-butylstyrene, maleic acid anhydride and N-alkyl-substituted maleic acid imides. The advantage of the process according to the present invention manifests itself inter alia in the fact that comonomers such as maleic acid anhydride and maleic acid imides corresponding to the following general formula

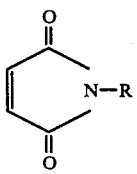

wherein R is a linear, branched chain or cyclic alkyl group having up to 12 C atoms, preferably a methyl or cyclohexyl group, can also be used. The above monomers are incapable, or at least are not sufficiently capable of copolymerisation with acrylonitrile by other methods, for example by polymerisation in aqueous media. In the present invention, both maleic acid anhydride and the maleic acid imides mentioned above may be copolymerised with acrylonitrile in molar ratios of from 1:1 to 1:4, particularly in combination with styrene.

The monomers mentioned above which are capable of copolymerisation with acrylonitrile, are used in proportions of up to 30% by weight (based on the total quantity of monomer mixture used). For some fields of application, polymers containing up to 15% by weight of comonomer are preferred.

The process according to the present invention makes use of the technique of precipitation polymerisation, i.e. the polymer materials which are produced precipitate in the course of the reaction as finely divided but easily filtered, particles from the mixture of aliphatic hydrocarbons and monomers which serves as precipitating medium. The process may be carried out either continuously or in batches. The ratio of the quantity of monomer used in the process to the quantity of aliphatic hydrocarbons should be adjusted according to the conversion rates that can be achieved, which may vary from 40 to 95% by weight but are preferably in the range of from 70 to 90% by weight. The proportion of monomers put into the reactive system is generally from 7 to 35% by weight, preferably from 20 to 32% by weight.

The aliphatic hydrocarbons, which are dominant components of the reaction medium, may be used as pure substances with definite boiling points in the range of from −10° C. to 80° C. or in the form of mixtures of the type commonly obtained from refineries boiling in the range of from −10° C. to 80° C. Examples of preferred hydrocarbons include butane, pentane and cyclohexane and the type of petroleum ether boiling in the range of from 40° to 80° C.

One important feature of the process according to the present invention is the use of a redox catalyst system consisting of sulphur dioxide, a hydroperoxide and an acid which is soluble in the system. This system enables polymerisation to be carried out at relatively low temperatures in the range of from 0° to 60° C.

Sulphur dioxide may be supplied to the polymerisation mixture either in liquid or in gaseous form in quantities of from 0.1 to 8.0 mol %, based on the quantity of monomers used.

The hydroperoxides soluble in the reaction medium are used in quantities of from 0.1 to 2 mol % and preferably are of the type substituted with secondary and tertiary alkyl groups or are of the type containing aralkyl groups, such as those which may be obtained, for example, by the alkylation of hydrogen peroxide with suitable alkyl halides, dialkylsulphates or alcohols in the presence of strong acids, or by the chemical addition of hydrogen peroxide to olefins. Tertiary butyl hydroperoxide and cumene hydroperoxide, which are commercially readily available, are preferred. The progress of polymerisation, and the properties of the resulting polymers, are determined decisively by the proportions in which the two redox components $SO_2$/hydroperoxide are used. It has been found advantageous to adjust these proportions to a molar ratio in the range of from 1:1 to 6:1.

In addition to the two redox partners $SO_2$/hydroperoxide there is used an acid which is soluble in the system. Acids suitable for this purpose include, in particular, organic acids preferably partially halogenated and perhalogenated carboxylic acids having up to 10 C-atoms, used in quantities of from 0.01 to 1.0 mol %. Among these acids, the following are preferred: trichloroacetic acid, perchloropropionic acid and perchlorobutyric acid. The carboxylic acids have a regulating effect on the initiation of polymerisation and the process of molecular growth. Satisfactory thermostability of the resulting polymers is thereby achieved.

The precipitation polymers obtained by the process according to the present invention can if desired, be isolated as fine powders having bulk densities of from 0.1 to 0.5 g/cm³ after filtration, washing and drying.

Alternatively, the polymer may be directly converted into a suitable solution for a shaping process. This may be done by subjecting the moist filter cake, whilst still containing aliphatic hydrocarbon and unreacted monomer, to one or more stages of washing with a low boiling organic washing liquid which will not dissolve the polymer, optionally employing pressure for this washing process, and then introducing the thus pretreated filter cake directly into a suitable solvent for the polymer, transferring the solution to an evaporator to remove the washing liquid introduced with the polymer and any small residues of monomer, and at the same time adjusting the solution to a suitable concentration and viscosity for the shaping process. Any of the commonly known types of evaporators are suitable for this purpose, for example thin layer evaporators, falling film evaporators and evaporation screws.

The above method differs from conventional processes in that an energy intensive drying stage and a temporary storage of the dry polymer are dispersed with. Regardless of the technique employed for working up the product, the process according to the present invention provides the possibility of a simpler method of recycling all the components of the system.

The polymers produced by the process according to the present invention have unexpected properties. For example, it was not foreseeable that without the use of ionic comonomers, in particular of components containing sulphonic acid groups, the polymers obtained, for example in the form of powders or shaped products, would have excellent dye absorption capacities for cationic dyes. This property manifests itself in a comparatively high electrical conductivity of the polymer solutions, and in a relative high sulphur content bound to the polymer.

When processing polyacrylonitriles which are free from comonomers, numerous difficulties arise when the known art methods are employed. Dissolving pure polyacrylonitrile is a lengthy and tedious process and the solutions obtained are insufficiently stable with regard to their viscosities. Furthermore, shaped products produced from such solutions can only be used in the technical field due to their unsatisfactory dye absorption characteristics.

The polyacrylonitriles free from comonomers which can be produced according to the present invention on the other hand, not only have the advantageous properties which are characteristic of polyacrylonitrile, such as dimensional stability of the shaped products produced therefrom, but also have excellent processing characteristics and a good dye absorption capacity for cationic dyes.

The dye absorption capacities of the polymers obtained by the process according to the invention were determined by the following method:

1 g of dye per liter of prepared solution was dissolved in hot distilled water, and 1 ml of dilute acetic acid (30 g/l) and 1 ml of sodium acetate solution (40 g/l) were then added. The volume was made up to the calibration mark at 20° C. to obtain the dye liquor. 50 mg of a foil obtained from a dimethylformamide solution of the corresponding polymer was heated under reflux for 1½ hours in 10 ml of the dye liquor obtained as above. The foil was removed from the liquor and rinsed, and was then boiled for ½ hour in distilled water. The dyes used were a blue dye corresponding to formula (I)

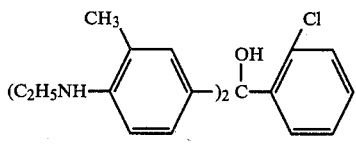

and a red dye corresponding to formula (II)

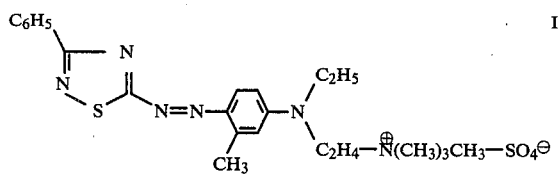

After this treatment, the foil was dried and dissolved in dimethylformamide. The quantity of dye absorbed was determined by an extinction measurement in a conventional photometer.

The conductivity values of the polymer given above and in the following Examples were determined as follows:

800 mg of thoroughly dried polymer powder was dissolved in 80 ml of dimethylformamide having an intrinsic conductivity below 0.06 $\mu$S with the addition of 4 ml of methanol having an intrinsic conductivity below 0.06 $\mu$S. The polymer solution obtained was treated with 10 ml of a mixed bed exchanger to separate the ionic compounds which were not bound to the polymer. After 30 minutes of exchange, the clear supernatant polymer solution was removed and its conductivity was determined in an ordinary commercial measuring cell at 20° C. The value obtained, in $\mu$ Siemens, is a measure of the concentration of ionic groups bound to the polymer.

The K-values given for the polymers were determined in 1% dimethylformamide solution at 20° C. by the method of H. Fikentscher, Cellulosechemie 15 (1932), page 58. The intrinsic viscosity numbers [$\eta$] given in the Examples were determined in dimethylformamide solution at 25° C. and are given in dl/g. For a definition of the intrinsic viscosity number, see H.-G.Elias, Makromoleküle, publishers Hüthig and Wepf-Verlag, Basle, page 265.

The examples which follow serve to illustrate the present invention in more detail. Parts by weight are related to parts by volume as kilograms are to liters.

EXAMPLE 1

(a) Preparation of a Copolymer of Acrylonitrile/methyl Acrylate.

The following were introduced into an autoclave:
37.8 parts by volume of petroleum ether (bp. 40°-80° C.)
4.5 parts by weight of acrylonitrile
0.27 parts by weight of methyl acrylate
0.01 parts by weight of trichloroacetic acid
0.015 parts by weight of tert.-butylhydroperoxide.

After nitrogen had been passed through and the mixture had been heated to 35° C., the following three solutions were added simultaneously, at a constant rate over 5 hours:

Solution I 24.54 parts by volume of petroleum ether (bp. 40°-80° C.)
4.0 parts by weight of acrylonitrile
0.45 parts by weight of methyl acrylate
0.01 parts by weight of trichloroacetic acid Solution II 6.14 parts by volume of petroleum ether (bp. 40°-80° C.)
4.0 parts by weight of acrylonitrile
0.23 parts by volume of sulphur dioxide Solution III 6.14 parts by volume of petroleum ether (bp. 40°-80° C.)
parts by weight of acrylonitrile
parts by weight of methyl acrylate
0.095 parts by weight of tertiary butyl hydroperoxide When all these reactants had been introduced, stirring was continued for a further 15 minutes at 35° C. The petroleum ether used as precipitation medium and portions of unreacted monomers were then removed by centrifuging. The filter cake obtained was then washed with 60 parts by volume of petroleum ether. A polymer having the following properties was isolated:
Composition:
94.0% by weight of acrylonitrile
5.0% by weight of methyl acrylate
0.3% by weight of bound sulphur
K-value 76
Conductivity: 11.9 $\mu$S
Yield: 14 parts by weight (corresponding to a conversion of 85.8% by weight)

(b) Determination of the dye absorption capacity

The polymer removed from the centrifuge after washing, which was still moist with petroleum ether, and which had a solid content of 75% by weight was mixed with dimethylformamide in proportions by weight of 1:2 without being dried first.

After a short time, which was required for dissolving the polymer, the volatile constituents, consisting of petroleum ether and small quantities of unreacted monomers, were removed in a thin layer evaporator at 0.8 bar and 55° C. 50 Parts by weight of a 28% solution in DMF of the acrylonitrile/methyl acrylate copolymer having a viscosity of 80 Pa.s/20° C. was obtained in this way.

A film of this solution was then applied by painting to form a foil with a thickness of 50 μm. This foil was dyed with blue dye I and red dye II as described above and the dye absorption capacity was determined by comparison with a commercial material (composition: 94.0% by weight acrylonitrile, 5% by weight methyl acrylate, 1.0% by weight methallylsulphonate, K-value 78, conductivity: 11.2 μS).

|   | Dye absorption capacity of the foil obtained by the process according to the present invention | Dye absorption capacity of the comparison foil (commercial product) |
|---|---|---|
| Dye I (blue) | 10.2% by wt. | 5.7% by wt. |
| Dye II (red) | 3.7% by wt. | 3.2% by wt. |

EXAMPLE 2

Preparation of an Acrylonitrile/methyl Acrylate Copolymer

The following were first introduced into an autoclave:
250 parts by volume of petroleum ether (bp. 20°–40° C.)
32.2 parts by volume of acrylonitrile
12.4 parts by volume of methyl acrylate
0.15 parts by weight of perchloropropionic acid.

After nitrogen had been passed through and the mixture had been heated to 30° C., the following three solutions were added simultaneously at a constant rate over 4 hours:

Solution I 450 parts by volume of petroleum ether (bp. 20°–40° C.)
128.8 parts by volume of acrylonitrile
12.4 parts by volume of methyl acrylate
0.15 parts by volume of perchloropropionic acid Solution II 70 parts by volume of petroleum ether
57 parts by volume of acrylonitrile
4 parts by volume of sulphur dioxide (condensed)

Solution III 150 parts by volume of petroleum ether
24.8 parts by volume of acrylonitrile
5.6 parts by volume of methyl acrylate
1.7 parts by volume of tertiary butyl hydroperoxide After cooling of the resulting polymer suspension, petroleum ether and unreacted monomer constituents were removed by centrifuging. The filter cake was then washed with 500 parts by volume of petroleum ether (bp. 20°–40° C.). A polymer having the following properties was isolated:
Composition:
87.5% by weight of acylonitrile
11.5% by weight of methyl acrylate
0.33% by weight of bound sulphur
K-value: 70
Conductivity: 14.5 μS Yield: 203.5% by weight (corresponding to a conversion of 91.0% by weight).

The dye absorption capacity was determined by the method indicated in Example 1 i.e. Conversion of the polymer into a dimethylformamide solution, preparation of a 50 μm thick foil and dyeing. When compared with a commercial material (composition: 94% by weight acrylonitrile, 5% by weight methyl acrylate, 1.0% by weight methyallylsulphonate, K-value 78), the following results were obtained:

|   | Dye absorption capacity of foil obtained according to Example | Dye absorption capacity of comparison foil (trade product) |
|---|---|---|
| Dye I (blue) | 13.2% by wt. | 5.7% by wt. |
| Dye II (red) | 4.5% by wt. | 3.2% by wt. |

EXAMPLE 3

Preparation of an Acrylonitrile Homopolymer by the Process According to the Present Invention The following were introduced into an autoclave:
250 parts by volume of petroleum ether (bp. 40°–80° C.)
80 parts by volume of acrylonitrile
0.4 parts by weight of trichloroacetic acid.

After nitrogen had been passed through and the mixture adjusted to 35° C., the following three solutions were added simultaneously over 3 hours:

Solution I 450 parts by volume of petroleum ether (bp. 40°–80° C.)
128.8 parts by volume of acrylonitrile
1.0 part by weight of trichloroacetic acid Solution II 70 parts by volume of petroleum ether (bp. 40°–80° C.)
57 parts by volume of acrylonitrile
6.5 parts by volume of sulphur dioxide (condensed)

Solution III 150 parts by volume of petroleum ether (bp. 40°–80° C.)
28.8 parts by volume of acrylonitrile
2.55 parts by volume of tert.-butyl hydroperoxide When polymerisation had been terminated, petroleum ether and unreacted acrylonitrile were removed by filtration. After washing with a further 100 parts by volume of petroleum ether and subsequent drying, a polymer having the following properties was obtained:
Composition: Polyacrylonitrile containing 0.6% by weight of bound sulphur
K-value: 81
Conductivity: 16.3 μS Yield: 189 parts by weight (corresponding to a conversion of 80.1% by weight).

The polymer obtained above was processed to a foil 50μ in thickness by the usual method. Its dye absorption capacity was determined by comparison with a commercial material (polyacrylonitrile containing 0.1% by weight of sulphur fixed to the polymer and prepared by polymerisation in an aqueous medium, K-value 89, conductivity: 4.5 μS).

| | Dye absorption of the foil obtained according to Example 3 | Dye absorption of the comparison foil (trade product) |
|---|---|---|
| Dye I (blue) | 6.8% by wt. | 1.5% by wt. |
| Dye II (blue) | 3.2% by wt. | 0.5% by wt. |

EXAMPLE 4

Preparation of an Acrylonitrile Homopolymer by the Process According to the Present Invention The following were introduced into an autoclave:
250 parts by volume of petroleum ether (bp. 40°–80° C.)
80 parts by volume of acrylonitrile
0.6 parts by weight of trichloroacetic acid.

After nitrogen had been passed through and the mixture had been adjusted to 35° C., the following three solutions were added simultaneously and at a constant rate over 3 hours:

Solution I 450 parts by volume of petroleum ether (bp. 40°–80° C.)
128.8 parts by volume of acrylonitrile
1.5 parts by volume of trichloroacetic acid

Solution II 70 parts by volume of petroleum ether (bp. 40°–80° C.)
57 parts by volume of acrylonitrile
7.2 parts by volume of sulphur dioxide (condensed)

Solution III 150 parts by volume of petroleum ether
24.8 parts by volume of acrylonitrile
6.0 parts by volume of tert.-butyl hydroperoxide The polymer suspension obtained was worked up in the usual manner by filtration, washing and then drying. A polymer having the following properties was obtained:

Composition: Polyacrylonitrile containing 0.9% by weight of sulphur fixed to the polymer
K-value: 63
Conductivity: 18.6 µS
Yield: 194 parts by weight (corresponding to a conversion of 83.3% by weight)
Dye absorption:
Blue dye I: 9.7% by weight
Red dye II: 4.3% by weight

EXAMPLE 5

Preparation of Acrylonitrile/methyl Acrylate Copolymer by Continuous Polymerisation in Cyclohexane The following solutions I to V were used for polymerisation:

Solution I 1870 parts by weight of cyclohexane
270 parts by weight of acrylonitrile
16.5 parts by weight of methyl acrylate
1.8 parts by weight of cumene hydroperoxide (100%)
0.75 parts by weight of trichloroacetic acid

Solution II 3750 parts by weight of cyclohexane
850 parts by weight of acrylonitrile
51 parts by weight of methyl acrylate
2.0 parts by weight of trichloroacetic acid

Solution III 3750 parts by weight of cyclohexane
850 parts by weight of acrylonitrile
51 parts by weight of methyl acrylate
29 parts by weight of sulphur dioxide

Solution IV 3750 parts by weight of cyclohexane
850 parts by weight of acrylonitrile
51 parts by weight of methyl acrylate
17 parts by weight of cumene hydroperoxide (100%)

Solution V 30 parts by weight of cyclohexane
16 parts by weight of acrylonitrile
1 part by weight of methyl acrylate
3 parts by weight of sulphur dioxide.

Solution I was introduced, under an atmosphere of nitrogen, into a stirrer reactor equipped with a grid stirrer and an overflow pipe connected to a bottom discharge opening, and the solution was adjusted to 50° C. This temperature was maintained throughout the reaction. In a phase of prepolymerisation lasting 1.5 hours during which time the stirrer was maintained at a speed of 250 revs/min., the following streams of substances were pumped in simultaneously:

Solution II: 300 parts by volume per hour
Solution III: 300 parts by volume per hour
Solution IV: 300 parts by volume per hour Solution V: 40 parts by volume per hour.

At the end of this time, the overflow level in the discharge pipe was reached. In the continuous process which then followed, polymer dispersion was continuously discharged at a rate (ca. 700 parts by weight per hour) corresponding to the following rate of addition of the solutions:

Solution II: 300 parts by volume per hour
Solution III: 300 parts by volume per hour
Solution IV: 300 parts by volume per hour.

After a polymerisation time of 5 hours, a steady state was reached with regard to conversion rate, polymer composition and average molecular weight.

An acrylonitrile/methyl acrylate copolymer having the following properties was obtained:
Composition:
92.5% by weight of acrylonitrile
6.0% by weight of methyl acrylate
0.55% by weight of sulphur fixed to the polymer
K-value: 79 [η] DMF=1.39
Yield: 110 parts by weight of polymer/hour (this corresponds to a conversion of 81% by weight at a dwell time of 4.5 hours)
Dye absorption:
Blue dye I: 11.0% by weight
Red dye II: 4.1% by weight
Conductivity: 15.5 µS.

The polymer suspension obtained was worked up as described in Example 7b and was converted into a solution in dimethylformamide having a solids concentration of 29% by weight and a solution viscosity of 83 Pa.s at 20° C.

EXAMPLE 6

Preparation of an Acrylonitrile/styrene Copolymer

The following solutions I, II, III and IV were used for polymerisation:

Solution I 330 parts by weight of petroleum ether (bp. 40°–80° C.)
18.5 parts by weight of acrylonitrile
1.5 parts by weight of styrene Solution II 280 parts by weight of petroleum ether (bp. 40°–80° C.)
125.5 parts by weight of acrylonitrile
165.5 parts by weight of styrene
0.2 parts by weight of trichloroacetic acid Solution III 26.5 parts by weight of petroleum ether (bp. 40°–80° C.)
20.0 parts by weight of acrylonitrile
1.6 parts by weight of tert.-butyl hydroperoxide (100%)

Solution IV 26.5 parts by weight of petroleum ether (bp. 40°–80° C.)
20.0 parts by weight of acrylonitrile
2.5 parts by weight of sulphur dioxide.

50 parts by weight of an acrylonitrile/styrene copolymer*) and solution I were introduced into a stirrer vessel equipped with a spiral stirrer which swept the walls of the vessel, a reflux condenser cooled with ice water, and three metering devices for solutions II, III and IV, and the suspension formed by stirring (200 revs/min) was adjusted to 45° C.

It is advantageous to start the copolymerisation of acrylonitrile/styrene in a polymer medium in order to avoid complications in the initial phase, for example sticking and deposition at the edges, which might otherwise occur in the reaction mixture due to an increase in the styrene content. The polymer provided as starting medium must be adapted in its properties to the polymer which forms in the course of the reaction. The following acrylonitrile/styrene copolymer was used in the present example:

Composition:
88% by weight acrylonitrile
11% by weight styrene
0.25% by weight sulphur fixed to the polymer
K-value: 78.5 [η] DMF=1.37

Polymerization was started by the addition of 5 parts by volume each of solutions II and III. The temperature was adjusted to 45° C. during a reaction time of 6 hours and the following solutions were introduced simultaneously:

Solution II: 100 parts by volume per hour
Solution III: 10 parts by volume per hour
Solution IV: 10 parts by volume per hour.

After filtration and another washing cycle with petroleum ether, a polymer having the following properties was isolated:

Composition:
87.5% by eight of acrylonitrile
10.5% by weight of styrene
0.65% by weight of bound sulphur
K-value: 80 [η] DMF=1.39
Dye absorption:
Blue dye I: 9.8% by weight
Red dye II: 3.2% by weight
Conductivity: 14.8 μS
Yield: 170 parts by weight (minus the quantity of polymer initially provided in the reaction vessel)
Conversion: 85% by weight

EXAMPLE 7

(a) Preparation of an acrylonitrile/N-cyclohexylmaleic imide copolymer

The following solutions I, II, III and IV were used:

Solution I 24 650 parts by weight of petroleum ether (bp. 40°–80° C.) 4 500 parts by weight of acrylonitrile
450 parts by weight of N-cyclohexylmaleic imide
40 parts by weight of cumene hydroperoxide (100%)
7.2 parts by weight of trichloroacetic acid Solution II 17 450 parts by weight of petroleum ether (bp. 40°–80° C.)
4 150 parts by weight of acrylonitile
810 parts by weight of N-cyclohexylmaleic imide 14 parts by weight of trichloroacetic acid Solution III 4 150 parts by weight of petroleum ether (bp. 40°–80° C.) 4 070 parts by weight of acrylonitrile
180 parts by weight of sulphur dioxide Solution IV 3 800 parts by weight of petroleum ether (bp. 40°–80° C.)
3 320 parts by weight of acrylonitrile
82.5 parts by weight of cumene hydroperoxide (100%).

An inert gas atmosphere was produced in a stirrer autoclave of VA steel equipped with an anchor blade stirrer by nitrogen introduction. Solution I was then introduced as reaction medium and was adjusted to 35° C. in the sealed autoclave.

Polymerisation was started by the addition of 1500 parts by volume of solution III. Solution II, the remainder of solution III and solution IV were then added simultaneously through metering pumps:

Solution II: 6500 parts by volume per hour
Solution III: 2000 parts by volume per hour
Solution IV: 2000 parts by volume per hour The time take to introduce these solutions was 5 hours, and the reaction temperature was maintained constant at 35° C. during this time. The speed of stirring was increased hourly by 20 revs/min, starting at 80 revs/min.

The polymer suspension obtained was filtered after cooling to 10° to 15° C., and the filter cake, still containing petroleum ether and residues of monomers, was then made up into a slurry in ethanol and again filtered.

Polymer yield after dyring: 13,500 parts by weight (corresponding to a conversion of 78% by weight).

Composition of the polymer:
89.2% by weight of acrylonitrile
9.3% by weight of N-cyclohexylmaleic imide
0.6% by weight of sulphur fixed to the polymer K-value: 81 [η] DMF = 1.48
Dye absorption:
Blue dye I: 8.5% by weight
Red dye II: 3.2% by weight
Conductivity: 15.7 μS (b) Working up of the resulting polymer suspension in an evaporator screw.

The filter cake obtained from the first filtration was again washed with petroleum ether. The polymer residue, which still contained 60% by weight of washing solvent, was then transferred to the mixing zone of an evaporator screw where it was mixed with dimethylformamide in a proportion of weight of 1:1. The diphasic mixture was heated to 80° to 100° C. under compression in a heating zone, and most of the petroleum ether together with small quantities of residual monomer were then evaporated in a following evaporation zone under normal pressure. After passage through a further compression zone in which the highly viscous solution was adjusted to 80° to 90° C., residual washing liquid together with small quantities of dimethylformamide were removed in a second evaporation zone under vacuum (0.1 bar). A 31% by weight solution of the polymer in dimethylformamide which had a solution viscosity of 95 Pa.s at 20° C. and which was free from bubbles was then discharged. Dwell time: 1 to 3 minutes.

EXAMPLE 8

Preparation of an Acrylonitrile/styrene/maleic Acid Anhydride Compolymer

The following solutions I, II, III and IV were used for polymerisation:

Solution I 300 parts by weight of cyclohexane
115 parts by weight of acrylonitrile
6.8 parts by weight of styrene
6.4 parts by weight of maleic acid anhydride 0.2 parts by weight of trichloroacetic acid Solution II 300 parts by weight of cyclohexane
115 parts by weight of acrylonitrile
6.8 parts by weight of styrene
8.0 parts by weight of maleic acid anhydride 0.2 parts by weight of trichloroacetic acid Solution III 38 parts by weight of cyclohexane
14 parts by weight of acrylonitrile
0.8 parts by weight of styrene
3.6 parts by weight of cumene hydroperoxide Solution IV 38 parts by weight of cyclohexane
14 parts by weight of acrylonitrile
0.8 parts by weight of styrene
3.5 parts by weight of sulphur dioxide Solution I was introduced as reaction medium into a stirrer vessel equipped with a spiral stirrer which swept the walls of the vessel, a reflux condenser cooled with ice water and 3 metering devices for solutions II, III and IV, and the solution was adjusted to 50° C. in this reactor. Polymerisation was then started by the addition of 5 parts by volume each of solutions III and IV. During the phase of polymerisation, the following solutions were introduced simultaneously over 6 hours while the reaction temperature was maintained at 50° C.:

Solution II: 90 parts by volume per hour
Solution III: 10 parts by volume per hour
Solution IV: 10 parts by volume per hour After filtration and two more washing cycles with cyclohexane or methanol, a polymer having the following properties was isolated:

Composition:
84.7% by weight of acrylonitrile
7.5% by weight of styrene
7.0% by weight of maleic acid anhydride 0.45% by weight of bound sulphur
K-value: 77 [η] DMF = 1.24
Dye absorption:
Blue dye I: 10.2% by weight
Red dye II: 3.6% by weight
Conductivity: 15.2 μS
Yield: 192 parts by weight (corresponding to a conversion of 66% by weight).

We claim:

1. A process for the preparation of a polyacrylonitrile or of a co-polymer comprising predominantly acrylonitrile, said polymers having a K-value of from 50 to 100, a dye absorption capacity for cationic dyes of at least 0.5% by weight, a conductivity, measured in dimethylformamide solution, of at least 10μ Siemens, and from 0.2 to 1.5% by weight of sulfur fixed to said polymer, wherein acrylonitrile either alone or with up to 30% by weight of at least one ethylenically unsaturated comonomer, selected from the group consisting of acrylic acid alkyl esters, vinyl esters of aliphatic carboxylic acids, unsubstituted styrene or styrene substituted by alkyl groups, maleic acid andydride and N-alkyl-substituted maleic acid imides, is polymerized to conversions of from 40 to 95% by weight at temperatures of from 0° to 60° C., in an aliphatic hydrocarbon having a boiling point in the range of from −10° C. to 80° C. or in mixtures of aliphatic hydrocarbons boiling within the range of from −10° C. to 80° C., in the presence of a starter system consisting of from 0.1 to 8.0 mol % of sulfur dioxide, from 0.1 to 2.0 mol % of a hydroperoxide which is soluble in the reaction medium and from 0.01 to 1.0 mol % of an organic acid which is soluble in the reaction system (based in each case on the quantity of monomers used).

2. The process of claim 1, wherein said comonomer is maleic acid anhydride or a N-alkyl substituted maleic acid imide in combination with styrene in molar ratios in the range of from 1:1 to 1:4.

3. The process of claim 1, wherein said ethylenically unsaturated comonomer is copolymerized in a quantity of up to 15% by weight, based on the acrylonitrile used.

4. The process of claim 1, wherein said hydroperoxide is tert.-butyl hydroperoxide, cumene hydroperoxide or a mixture thereof.

5. The process of claim 1, wherein said organic acid which is soluble in the system is a partially halogenated or a perhalogenated carboxylic acid having up to 10 C-atoms.

6. A process according to claim 1 wherein the process is carried out under pressure.

* * * * *